E. E. F. CREIGHTON.
PROTECTIVE DEVICE.
APPLICATION FILED JULY 15, 1910.
1,055,881.
Patented Mar. 11, 1913.
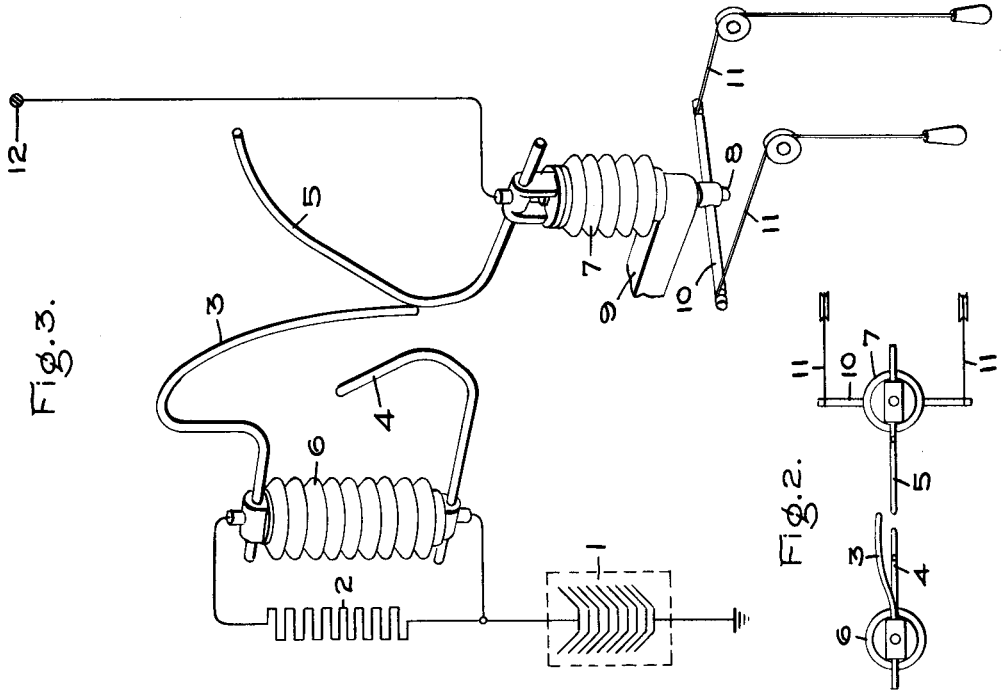
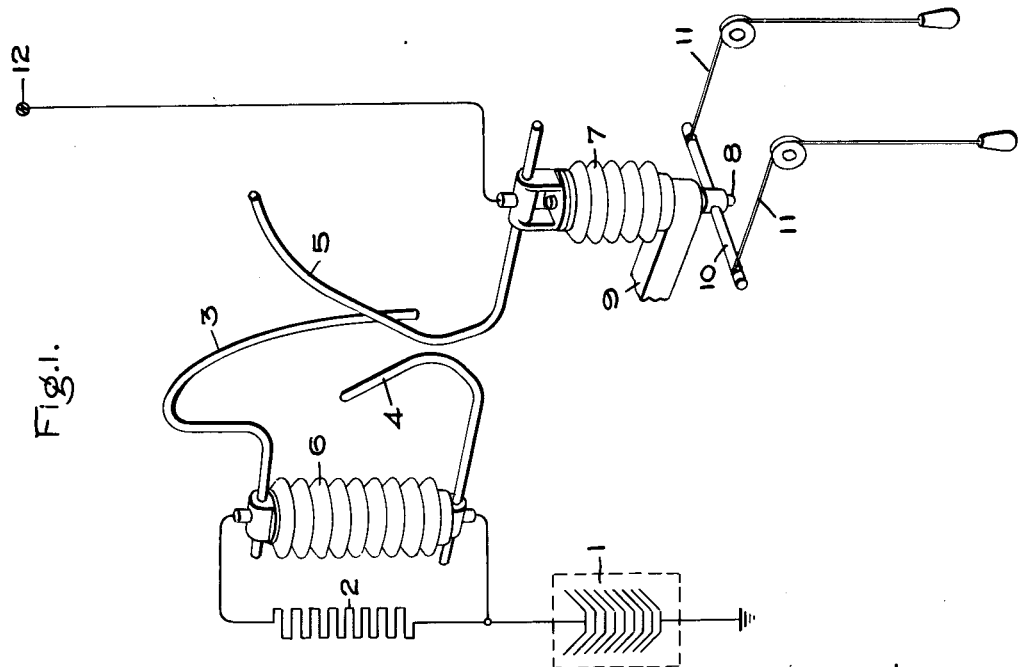
Witnesses:
Inventor:
Elmer E. F. Creighton,
by Albert G. Davis
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTIVE DEVICE.

1,055,881.      Specification of Letters Patent.      Patented Mar. 11, 1913.

Application filed July 15, 1910. Serial No. 572,105.

*To all whom it may concern:*

Be it known that I, ELMER E. F. CREIGHTON, a citizen of the United States, residing at Schenectady, county of Schenectady, State of New York, have invented certain new and useful Improvements in Protective Devices, of which the following is a specification.

My invention relates to devices for protecting electric conductors against lightning and other abnormal conditions, and more particularly to protective devices in which an electrolytic condenser cell is used.

In the electrolytic cells commonly used as lightning arresters, suitable electrodes with their surfaces covered with a thin film are immersed in a suitable electrolyte and upon the occurrence of abnormal potential on the conductor to be protected the film permits a free discharge of current through the cell. In order to prevent current leaking through the cell and heating the electrolyte, the cell is usually separated from the conductor to be protected by means of a spark gap which breaks down upon the occurrence of abnormal potential. Under these conditions no current normally flows through the cell and the film on the electrodes gradually deteriorates or is dissolved by the electrolyte. If the film has become deteriorated by standing in contact with the electrolyte, the cell will permit an initial rush of current great enough to set up severe surges on the line and damage the cell. The films are kept formed and in good condition by passing current through them at intervals, but the current which flows through the cell, particularly while the films are being reformed, is intermittent or irregular, and in many types of transmission lines, particularly cable systems having considerable capacity, the intermittent current flowing through the cell may be in resonance with the system and will set up dangerous surges and rises of potential.

The object of my invention is to provide a protective device in which an electrolytic cell may be charged without producing objectionable disturbances on the system to be protected; in which the current through the cell is prevented from pulsating in an objectionable manner; and in which abnormal potentials are taken off through the cell with a minimum disturbance to the system.

In carrying out my invention the current which flows through the cell, particularly when a deteriorated cell is connected to the line, is kept within predetermined limits and the irregularities in the current are damped out in any suitable manner, preferably by inserting some suitable current limiting means, such as a resistance, between the condenser and the line and arranging the mechanism so that the current for reforming the film flows through the current limiting means. In the preferred construction, a spark gap of any desired form, but preferably a horn gap, is connected in series between the conductor and the condenser and in any suitable manner the horn gap may be bridged at will to cause current to flow through a circuit containing suitable current limiting means and thence through the cell. In the preferred arrangement a spark gap is inserted between the cell and the conductor to be protected in series with a high resistance circuit through the cell, and a second spark gap is inserted in a low resistance circuit in series with the cell and having a higher breakdown voltage than the other spark gap. In order to form the film in the cell the spark gap in series with the high resistance circuit is bridged in a suitable manner so that current flows through a current limiting means such as the resistance, and thereby a comparatively steady current for forming the film is secured.

My invention will best be understood in connection with the accompanying drawings, which merely for purposes of illustration show some of the various forms which at the present time I consider to be the best embodiment of the principle of my invention, and in which—

Figure 1 represents one form of a protective device in its normal operating condition; Fig. 2 is a plan view of a portion of the device shown in Fig. 1; and Fig. 3 shows the same device during the operation of reforming the film on the electrodes of the condenser.

In the specific embodiment of the invention shown in the drawings, an electrolytic cell or condenser 1 of any suitable form is shown diagrammatically with one terminal connected to ground and the other terminal connected through a resistance 2 to an auxiliary electrode or horn 3 and through a low resistance lead to an electrode or horn 4 which is spaced away from an electrode or horn 5 mounted to diverge from both electrodes 3 and 4 and to coöperate with both said electrodes to form a horn gap. The electrodes 3 and 4 are separated by an insulator 6, and the electrode 5 is mounted upon a rotatable insulator 7 carried upon a rotatable shaft 8 mounted in a suitable frame 9 and rotated at will by any suitable operating mechanism such as an arm 10 actuated by cords 11 which are in a position to be easily accessible to the operator.

In the normal position of the device, as shown in Figs. 1 and 2, the auxiliary electrode 3 is in such relation to the electrode 5 that the gap between the electrodes 3 and 5 is considerably shorter and has a lower breakdown voltage than the gap between the electrodes 4 and 5, so that the electrolytic cell is connected to the line conductor 12 through a high resistance circuit containing a gap of low breakdown voltage and also through a low resistance circuit containing a gap of higher breakdown voltage. The auxiliary electrode 3 is also so arranged with reference to the electrode 4 that if an arc forms and rises on the horns 4 and 5 the auxiliary electrode 3 intercepts the arc, which will then extend between the auxiliary electrode 3 and the horn 5, and will consequently be brought automatically into series with the high resistance circuit containing the resistance 6. Owing to the lower breakdown voltage of the gap between the electrodes 3 and 5, discharges from the conductor 12 will tend to pass across the gap between the electrodes 3 and 5 and thence through the resistance 6 and the cell 1 to ground, while if the discharge becomes very severe the gap between the electrodes 4 and 5 will also break down and assist in relieving the conductor of abnormal potentials.

When the film in the cell 1 is to be reformed, the gap in the high resistance circuit is bridged in any suitable way, preferably by moving the electrode 5 by means of the cords 11, so that the electrodes either come into contact or into such proximity to each other that the voltage of the circuit will break down the gap between them and permit current to flow through the high resistance circuit containing the electrodes 5 and 3 and resistance 6 and thence through the cell 1, thereby reforming the film, while at the same time the current limiting resistance 6 not only limits the initial rush of current to such an amount that surges are not set up on the circuit, but also smoothes out the current to such an extent that surges on the transmission system are avoided, even though the capacity of the transmission system is such that without the current limiting resistance 6 objectionable surges would be set up by current through the cell.

The necessary resistance in the high resistance circuit may be secured in any desired way, and one method which may be adopted is to make the auxiliary electrode 3 of some high resistance material such as carborundum or a mixture of carborundum with some suitable binder, so that sufficient resistance to limit the flow of current as desired is contained in the auxiliary electrode and the resistance 6 may be omitted.

My invention may be embodied in many other forms than those herein described, and I therefore do not desire to limit myself to the precise arrangement disclosed, since various modifications thereof will suggest themselves to those skilled in the art without departing from the spirit of my invention, the scope of which is set forth in the annexed claims.

What I claim as new and desire to secure by Letters Patent of the United States, is,—

1. A protective device comprising an electrolytic condenser, two discharge paths through said condenser connected in parallel and each containing electrodes separated to form a spark gap, and means for at will completing one of said circuits to permit current to flow through said cell.

2. A protective device comprising an electrolytic cell, two discharge paths of different resistance connected to one terminal of said cell, electrodes in each discharge path separated to form a spark gap, and means for at will bridging the spark gap in the circuit of greater resistance.

3. A protective device comprising an electrolytic cell, a low resistance discharge path connected to one terminal of said cell and containing electrodes separated to form a spark gap, a high resistance discharge path connected to the same terminal of said cell and containing electrodes normally separated to form a spark gap of lower breakdown voltage than the gap in said low resistance discharge path, and means for at will bridging said spark gap in said high resistance discharge path to permit current to flow through said high resistance path and said cell.

4. In a protective device, the combination with an electrolytic condenser and a resistance in series therewith, of two relatively movable electrodes normally separated to form a spark gap and connected in series with said condenser and said resistance, and means for at will moving said electrodes relatively to each other to permit current to flow through said resistance and said condenser.

5. In a protective device, the combination with an electrolytic condenser and a resistance in series therewith, of a horn gap connected in series with said condenser and said resistance and comprising two diverging electrodes normally separated to form a spark gap, one of said electrodes being mounted to rotate and thereby decrease the gap to permit current to flow, and means for at will rotating said electrode.

6. In a protective device, the combination with an electrolytic condenser and a resistance in series therewith, of two relatively movable electrodes normally separated to form a spark gap and connected in series with said condenser and said resistance, means for moving said electrodes to bring them into proximity to each other and thereby permit current to flow, and a third electrode connected in series with said condenser and spaced away from one of said relatively movable electrodes to form a second spark gap.

7. In a protective device, the combination with an electrolytic condenser and a resistance connected in series therewith, of an electrode connected in series with said resistance, a second electrode spaced away from said first electrode to form a spark gap in series with said resistance and said condenser, and a third electrode connected in series with said condenser and spaced away from said first electrode at a greater distance than said second electrode to form a spark gap in series with said condenser.

8. The combination with an electrolytic condenser and a resistance in series therewith, of a horn gap lightning arrester having two diverging horns in series with said condenser, and an auxiliary horn mounted adjacent to one of said horns to diverge from the other horn and connected in series with said resistance.

9. In a protective device, the combination with an electrolytic condenser, of a line electrode, two coöperating electrodes spaced away from said line electrode to form two spark gaps in parallel and connected to said condenser through discharge paths of unequal resistance, and means for at will bridging the gap between the line electrode and that coöperating electrode which is in the discharge path of greater resistance.

In witness whereof, I have hereunto set my hand this 14th day of July, 1910.

ELMER E. F. CREIGHTON.

Witnesses:
 BENJAMIN B. HULL,
 MARGARET E. WOOLLEY.